(No Model.)

B. E. SAWYER.
SCREW THREAD GAGE.

No. 590,486. Patented Sept. 21, 1897.

Witnesses
Fannie C Clark
Mary E. Sawyer

Inventor.
Burnside Ellsworth Sawyer.

UNITED STATES PATENT OFFICE.

BURNSIDE ELLSWORTH SAWYER, OF ATHOL, MASSACHUSETTS.

SCREW-THREAD GAGE.

SPECIFICATION forming part of Letters Patent No. 590,486, dated September 21, 1897.

Application filed October 20, 1896. Serial No. 609,477. (No model.)

*To all whom it may concern:*

Be it known that I, BURNSIDE ELLSWORTH SAWYER, of Athol, in the county of Worcester and State of Massachusetts, have invented a new and Improved Screw-Thread Gage, of which the following is a specification.

My invention is an improvement in that class of screw-thread gages which consist of a handle and a series of toothed blades or gages proper which are pivoted to the end of said handle.

The object of my invention is to provide a gage whose blades shall be better adapted than its predecessors for insertion in small and large threaded bores or sockets and for use in all other practically accessible places and shall include in the most compact and convenient form all the pitches in ordinary use.

The construction of the gage is as hereinafter described, and shown in accompanying drawings, in which—

Figure 1:
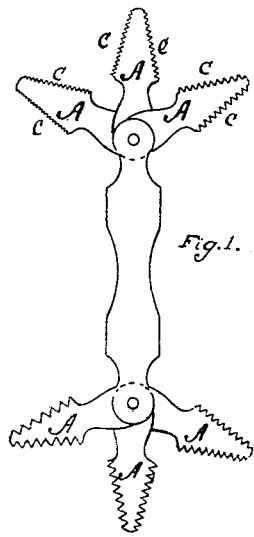
Figure 2:
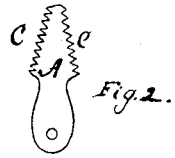
Figure 6:
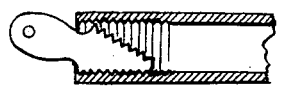
Figure 3:
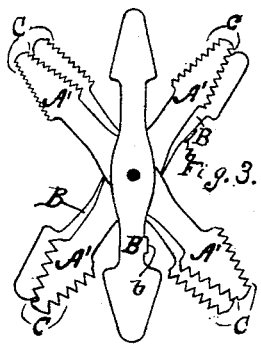
Figure 4:
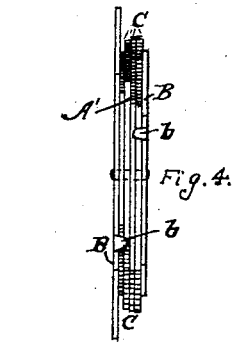
Figure 5:
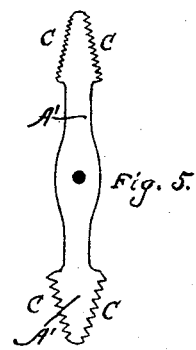

Figure 1 is a plan view of a handle having pivoted gage-blades constructed according to my invention. Fig. 2 is a plan view of one of the toothed blades of the same. Fig. 3 is a plan view of a gage embodying my complete invention, the toothed blades being shown open. Fig. 4 is a side or edge view of the same. Fig. 5 is a plan view of one of the blades having a tapered toothed head at each end. Fig. 6 is a view illustrating the practical use of the invention.

In Fig. 1 a series of toothed blades A is shown pivoted at each end of a handle. Each such blade (see also Fig. 2) is constructed with an enlarged, tapered, and pointed head, whose opposite edges C are provided with gage-teeth of uniform size and standard pitch, (sixty degrees.) The toothed edges C are at an acute angle to the longitudinal center of the blade A or to an imaginary line through such center. The blades being cut away or reduced in width in rear of the head, the latter may be completely inserted in certain sockets or tubes where it would otherwise be impracticable—that is to say, if the shank of the blades were of the full width of the widest portion of the toothed heads the latter could not be fully inserted in tubes whose diameter is but slightly greater than that of such heads, since the shank would in that case come in contact with the end of the tube. The construction and advantage here referred to will be apparent from inspection of Fig. 6.

In Figs. 3 to 5, inclusive, each blade A is provided at each end with an enlarged tapered head similar to the head of the blades A shown in Figs. 1 and 2 and before described. Thus each blade A' is double headed, but each toothed edge C is a gage distinct from every other.

The several gage-blades A' and two outside or case leaves B are pivoted together at the center. Said case-leaves B are similar to the gage-blades A' in general form or contour, so that when the gage is closed the several blades A' coincide with each other and the case-leaves B and lie with their edges flush. The leaves B are provided with a guard or flange b at one edge, which extends inward over the adjacent edges of half of the gage-blades A' to prevent the latter from turning completely round and disturbing the regular succession of the numbers on the blades—that is to say, in practice the several blades bear numbers indicating the particular standard gages formed on their respective edges and the said numbers run serially or in regular order, which corresponds to the gradation of the gage-teeth.

It will be seen that the regularly tapered and pointed or triangular form of head of the gage-blades A and A' and the arrangement of the teeth at an angle to the central longitudinal line of such heads enables the latter to be inserted in very small bores or sockets, and yet adapts them for use in relatively large ones for determining the pitch of the thread cut therein.

It will be further seen that the form of the invention shown in Figs. 3, 4, and 5 provides a maximum number of gages proper in such connection and arrangement that when one gage is visible and accessible at one end of a blade A' another is also at the other end of the same blade, which obviously facilitates speedy selection of the particular gage required for use.

As an aid in definition of my invention I will state that a pointless shoe-sole gage has been provided with a series of different-size notches or teeth on opposite sides. Such invention was not designed for use and could not be used in the same manner nor for the same purpose as mine.

What I claim is—

1. A screw-thread gage-blade, having a pointed and tapered head with gage-teeth formed on opposite edges of it at an acute angle to the longitudinal center of the blade, said gage-teeth being of uniform size and angle for each pitch, and the shank of the blade being reduced or of less width than the head, substantially as shown and described.

2. A screw-thread gage composed of two outer case-leaves, and a series of gage-blades which are arranged between said leaves, and all pivoted together at the center, each gage-blade being provided with an enlarged, pointed, and tapered head whose edges have gage-teeth of uniform size and angle for each pitch, and arranged at an acute angle to longitudinal center of the blade, as shown and described, whereby when the gage is opened and the toothed heads exposed at one end, their opposite heads are similarly exposed, as specified.

3. The screw-thread gage composed of a series of toothed gage-blades and two outside, or case, leaves, pivoted together centrally, and the said leaves provided with guard-flanges extending inward, as shown and described, for the purpose specified.

In testimony whereof I have signed my name to this specification, in the presence of two subscribing witnesses, on this 14th day of October, A. D. 1896.

BURNSIDE ELLSWORTH SAWYER.

Witnesses:
EDGAR V. WILSON,
FRANK. A. ALDRICH.